Mar. 3, 1925. 1,528,743

W. B. REEVES

FENDER BRACING DEVICE

Filed June 18, 1921

Inventor
William B. Reeves

By Bacon & Thomas
Attorneys

Patented Mar. 3, 1925.

1,528,743

UNITED STATES PATENT OFFICE.

WILLIAM B. REEVES, OF WICHITA FALLS, TEXAS.

FENDER-BRACING DEVICE.

Application filed June 18, 1921. Serial No. 478,701.

*To all whom it may concern:*

Be it known that I, WILLIAM B. REEVES, citizen of the United States, residing at Wichita Falls, in the county of Wichita and State of Texas, have invented certain new and useful Improvements in Fender-Bracing Devices, of which the following is a specification.

The invention relates to improvements in an attachment for motor vehicles.

It is an object of the invention to provide a bracing device for supporting the fenders of a motor vehicle. The invention relates to a bracing device having particular application to Ford cars for supporting the fenders to prevent shaking and rattling thereof.

It is an object of the invention to provide a bracing device which may be attached with ease to motor vehicles now in use without materially altering or changing the construction thereof to permit the attachment of the brace.

It is a further object of the invention to provide a brace which is exceedingly light in construction and inexpensive to manufacture, yet one that will efficiently support the fenders when applied to a vehicle without presenting an unsightly or bulky appearance.

In the accompanying drawings I have shown a single embodiment of the invention, but it will be understood that the same is susceptible of many changes without departing from the spirit thereof.

Figure 1:
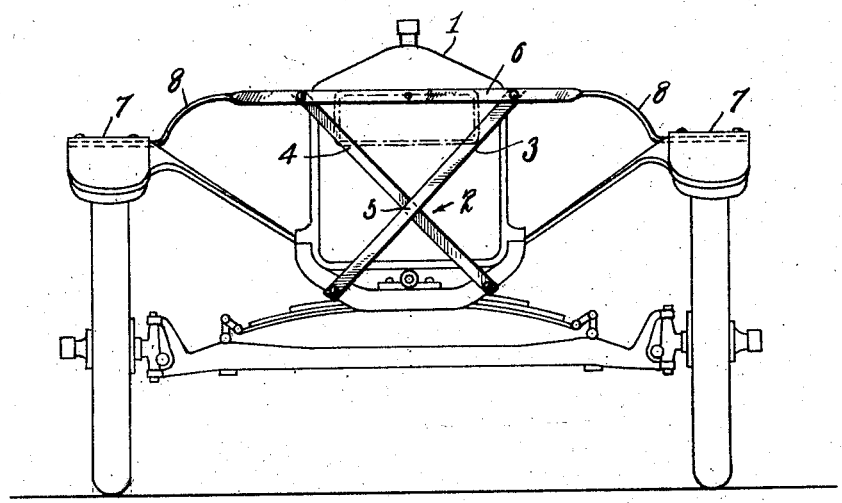
Figure 2:
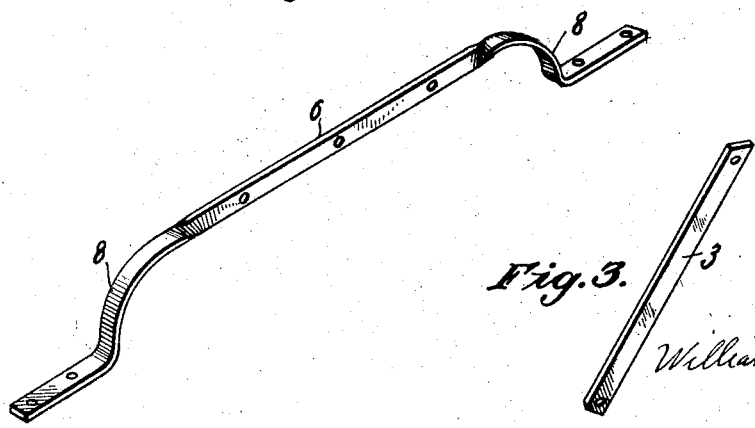
Figure 3:

In the drawings, Figure 1 is a front elevation; and Figures 2 and 3 are detail views.

Referring now more particularly to the drawings, wherein like reference characters indicate corresponding parts, the numeral 1 designates a motor vehicle, in the present disclosure the same being the well known Ford automobile. Although I have shown in the disclosure my device as being attached to a Ford car, it will be understood that the same is applicable to any kind of automobile with equal ease, and I have merely selected the Ford car for illustrating the function of the invention.

The device constituting the subject matter of my invention comprises a brace 2 consisting of a pair of angularly disposed upstanding rods 3 and 4, which cross one another at the point 5, and which rods may be constructed of flat metal of any kind, or any other suitable material.

The lower ends of these rods when the device is attached to a machine are bolted, riveted, or otherwise connected with the frame of the vehicle, while the upper ends of the rods support the transverse supporting element 6, being preferably riveted or bolted thereto. This transverse element 6 is, due to the crossed formation of the rods 2 and 3, rigidly supported, and near each end thereof is curved downwardly, and thence in a substantially horizontal direction to lie under and engage the fenders 7 on the machine. The downwardly extending portions 8 of the rod 6 may of course be curved or fashioned in different ways so long as the rod serves to be rigidly attached to and support the fenders of the vehicle. This cross rod also constitutes a support for the license tag or the like, and may be constructed of flat strip metal or any other material. It will thus be seen that the attachment may be readily applied to vehicles now in use, and that the same is decidedly inexpensive to manufacture, yet one that is sufficiently strong to thoroughly support the fenders. It will be noted that the material forming the supporting element 6 is shown as being composed of a flat strip, which is twisted from the point where the downward extensions 8 project so that the wide portions of the supporting element present surfaces for engaging and supporting the fenders.

While the device is shown as consisting of flat metal, manifestly round rods or any other suitable supporting material may be employed. It will also be appreciated that an attachment of this character does not serve to enclose a material portion of the radiator, nor does it give the vehicle a bulky or unsightly appearance, yet it provides ample support for the fenders, so as to prevent the excessive vibration to which the vehicle is subjected, and to prevent the fenders from becoming loosened and rattle.

Having thus described the invention, what I claim is:

1. A support for vehicle fenders comprising angularly disposed upstanding members, said members crossing one another, and rigidly secured at their lower ends to the vehicle chassis, a transverse element mounted upon the upper ends of said members and being provided with end portions adapted to engage and support the fenders, said transverse element being composed of flat metallic material, having the elongated flat side forming the intermediate portion thereof apertured and having the flat sides of each end portion of the transverse element horizontally disposed.

2. A fender brace for automobiles, comprising a horizontally-disposed transverse bar located in front of the radiator and having its opposite ends disposed in a horizontal plane below the plane of the transverse bar and secured to the undersides of said fenders, and bars crossing each other and connected at their upper ends to the transverse bar and at their lower ends to a fixed part of the automobile.

3. In a brace construction for motor vehicles provided with mud guards and a chassis, a main brace member disposed transversely of the motor vehicle, means for connecting the ends of said main brace member to the mud guards and crossed brace members located in front of the radiator and secured to said main brace member and to the chassis of said motor vehicle.

In testimony whereof I affix my signature.

WILLIAM B. REEVES.